United States Patent
Kazahaya et al.

(10) Patent No.: US 8,677,986 B2
(45) Date of Patent: Mar. 25, 2014

(54) ELECTRODEPOSITED WIRE TOOL AND MANUFACTURING METHOD THEREOF

(75) Inventors: Katsuo Kazahaya, Kato (JP); Yasushi Matsumoto, Kato (JP); Toshio Fukunishi, Kato (JP); Munehiro Tsujimoto, Kato (JP); Hideki Ogawa, Kato (JP); Masaaki Yamanaka, Kato (JP); Kenji Fukushima, Kato (JP)

(73) Assignee: A.L.M.T. Corp., Tokyo (JP)

( * ) Notice: Subject to any disclaimer, the term of this patent is extended or adjusted under 35 U.S.C. 154(b) by 747 days.

(21) Appl. No.: 12/937,118

(22) PCT Filed: Apr. 8, 2009

(86) PCT No.: PCT/JP2009/057163
§ 371 (c)(1),
(2), (4) Date: Oct. 8, 2010

(87) PCT Pub. No.: WO2009/125780
PCT Pub. Date: Oct. 15, 2009

(65) Prior Publication Data
US 2011/0034113 A1 Feb. 10, 2011

(30) Foreign Application Priority Data

Apr. 11, 2008 (JP) ................... 2008-103848
Apr. 18, 2008 (JP) ................... 2008-109339

(51) Int. Cl.
*B28D 1/06* (2006.01)

(52) U.S. Cl.
USPC ........... 125/16.01; 125/21; 451/298; 451/528

(58) Field of Classification Search
USPC ......... 451/296, 298, 527, 528; 125/12, 16.01, 125/16.02, 21
See application file for complete search history.

(56) References Cited

U.S. PATENT DOCUMENTS

| | | | | |
|---|---|---|---|---|
| 5,810,643 | A | * | 9/1998 | Toyama ............................ 451/5 |
| 6,178,962 | B1 | * | 1/2001 | Ohashi et al. ............... 125/16.01 |
| 7,089,925 | B1 | * | 8/2006 | Lin et al. ........................ 125/21 |
| 2008/0261499 | A1 | | 10/2008 | Tani et al. |
| 2009/0120422 | A1 | | 5/2009 | Taniguchi |

FOREIGN PATENT DOCUMENTS

| | | |
|---|---|---|
| CN | 1933942 A | 3/2007 |
| EP | 1 886 753 A1 | 2/2008 |
| JP | 53-14489 A | 2/1978 |
| JP | 53-96589 A | 8/1978 |
| JP | 63-34071 A | 2/1988 |

(Continued)

OTHER PUBLICATIONS

Office Action dated Mar. 7, 2013 for counterpart Chinese Application with partial English translation.

(Continued)

*Primary Examiner* — Eileen P. Morgan
(74) *Attorney, Agent, or Firm* — Birch, Stewart, Kolasch & Birch, LLP

(57) ABSTRACT

An electrodeposited wire tool has a core wire extending in a longitudinal direction, a plating layer provided on an outer peripheral surface of the core wire, superabrasive grains held by the plating layer and coating layers covering the outer peripheral surfaces of the superabrasive grains. The coating layers are constituted of electroless Ni—P platings. The coating layers are heat-treated, and the electroless Ni—P platings are partially or entirely crystallized.

13 Claims, 13 Drawing Sheets

(56) References Cited

FOREIGN PATENT DOCUMENTS

| | | |
|---|---|---|
| JP | 9-1455 A | 1/1997 |
| JP | 9-254008 A | 9/1997 |
| JP | 2002-264014 A | 9/2002 |
| JP | 2004-50301 A | 2/2004 |
| JP | 2007-307669 A | 11/2007 |
| JP | 2008-6584 A | 1/2008 |
| JP | 2008-38990 A | 2/2008 |
| WO | WO 2007/039934 A1 | 4/2007 |

OTHER PUBLICATIONS

European Search Report mailed Feb. 7, 2013.
Korean Office Action mailed May 23, 2012 with English translation.

* cited by examiner

ELECTRODEPOSITED WIRE TOOL AND MANUFACTURING METHOD THEREOF

TECHNICAL FIELD

The present invention relates to an electrodeposited wire tool and a method of manufacturing the same, and more specifically, it relates to an electrodeposited wire tool in which metallized abrasive grains are held on the outer peripheral surface of a magnetic linear body and a method of manufacturing the same.

BACKGROUND ART

In general, electrodeposited wire tools are disclosed in Japanese Patent Laying-Open No. 53-96589 (Patent Document 1), Japanese Patent Laying-Open No. 53-14489 (Patent Document 2), Japanese Patent Laying-Open No. 63-34071 (Patent Document 3) and Japanese Patent Laying-Open No. 2004-50301 (Patent Document 4).

Patent Document 1 discloses a method of manufacturing an electrodeposited wire tool by mixing abrasive grains into a plating solution and performing composite plating while impregnating (dipping) a piano wire with (in) the plating solution.

According to this method, however, it is difficult to produce an electrodeposited wire tool in which abrasive grains are homogeneously dispersed in a high density at a high speed in a stable manner.

Patent Document 2 discloses a method of manufacturing an electrodeposited wire tool by magnetizing a piano wire, making the magnetized piano wire adsorb magnetic or previously magnetically treated metallized abrasive grains and fixing the abrasive grains by plating the same in the adsorbed state.

Also mentioned is a treatment of coating the surfaces of abrasive grains with iron or nickel which is a magnetic metal by ion plating or a plating method and magnetizing metallized abrasive grains obtained in this manner.

According to Patent Document, however, the metallized abrasive grains are aggregated if the metallized abrasive grains coated with iron or nickel are adsorbed by the magnetized piano wire. This is because iron or nickel is a ferromagnet and hence the adsorption power resulting from the magnetism thereof is excessively large with respect to the sizes (weights) of the abrasive grains. In particular, this tendency is remarkable when the sizes of the abrasive grains are not more than 60 µm.

Patent Document 3 discloses a method of manufacturing an electrodeposited grindstone by forming ferromagnetic metallized layers on the surfaces of abrasive grains in an electroless plating solution containing nickel ions, magnetizing the abrasive grains with a magnetizer, introducing the magnetized metallized abrasive grains into a plating solution in which a ferromagnetic grinding head metal is dipped and performing plating while stirring the plating solution. At present, diamond abrasive grains coated with electroless Ni—B platings are not put on the market, and an extremely high cost is required if the same are manufactured.

Patent Document 4 describes an example of making a piano wire adsorb metallized diamond abrasive grains coated with electroless Ni—P platings through magnetic force and fixing the abrasive grains by electric nickel plating.

However, the electroless Ni—P platings shown in Patent Document 4 are nonmagnetic, and nonmagnetic metallized abrasive grains cannot be adsorbed by the piano wire in a high density.

Further, reduction of adsorption power deteriorates homogeneous dispersibility of the abrasive grains in an electrodeposited wire tool.

CITATION LIST

Patent Document

Patent Document 1: Japanese Patent Laying-Open No. 53-96589
Patent Document 2: Japanese Patent Laying-Open No. 53-14489
Patent Document 3: Japanese Patent Laying-Open No. 63-34071
Patent Document 4: Japanese Patent Laying-Open No. 2004-50301

SUMMARY OF THE INVENTION

Problems to be Solved by the Invention

Accordingly, the present invention has been proposed in order to solve the aforementioned problems, and aims at providing a high-quality electrodeposited wire tool and a method of manufacturing the same.

Means for Solving the Problems

The electrodeposited wire tool according to the present invention comprises a magnetic linear body and a plurality of metallized abrasive grains provided with metal coatings fixed to the outer peripheral surface of the magnetic linear body with a plating layer. The metal coatings include electroless Ni—P platings, and the electroless Ni—P platings are at least partially crystallized.

The electrodeposited wire tool structured in this manner is hard since the electroless Ni—P platings covering the abrasive grains constituted of diamond or CBN are at least partially crystallized. According to this structure, the electrodeposited wire tool is hardly worn on the interfaces between the abrasive grains and the electroless Ni—P platings supporting the same in the use of the electrodeposited wire tool. Thus, fall of the abrasive grains resulting from working is prevented, and the tool life elongates.

Preferably, the metal coatings include electroless Ni—P platings having a P content of not less than 4 mass %, and the electroless Ni—P platings are at least partially crystallized.

More preferably, the P content in the electroless Ni—P platings is not less than 6 mass % and not more than 9 mass %.

Thus, the effect of preventing fall of the abrasive grains resulting from working is optimized. Further, the cost for the abrasive grains can be suppressed to the minimum. In the range of an investigation made by the inventor, metallized abrasive grains coated with electroless Ni—P platings having a P content smaller than 4 mass % are not put on the market.

This is because there are the following four problems:
(1) It is difficult to control a plating solution.
(2) A plating speed is slow.
(3) The life of the plating solution is short.
(4) The plating solution is high-priced.

Incidentally, metallized abrasive grains coated with the aforementioned electroless Ni—B platings are not put on the market either for the same reasons. When prepared by the method according to the present invention described later, there is a more remarkable advantage.

The specific resistance of the electroless Ni—P platings increases if the P content is set to not less than 4 mass %, more preferably to not less than 6 mass % and not more than 9 mass %, whereby aggregated metallized abrasive grains can be prevented from being fixed to the surface of the magnetic linear body. Thus, an electrodeposited wire tool including abrasive grains having aligned heights can be obtained.

Preferably, the metallized abrasive grains contain diamond, and a strength ratio $Ni_3P(231)$/diamond(111) by XRD analysis is not less than 0.01 and not more than 0.3.

Strength $Ni_3P(231)$ denotes the strength of an XRD peak based on a 231 plane of an $Ni_3P$ crystal. Diamond(111) denotes the strength of an XRD peak based on a 111 plane of a diamond crystal.

The degree of crystallization of the electroless Ni—P platings can be indirectly recognized by recognizing the strength ratio. The quantity of adsorption of the abrasive grains can be rendered ideal by using abrasive grains having strength within the range, and a waste of the abrasive grains as well as a waste of electric power can be reduced. The quantity of adsorption of the abrasive grains to the wire is reduced if the strength ratio is less than 0.01, and slightly out of the ideal state.

If the strength ratio exceeds 0.3, a considerably long-term heat treatment is necessary, and there is a possibility that the surfaces of the metallized abrasive grains are oxidized. If the same are oxidized, there is a possibility that fixation strength of the abrasive grains to the wire by nickel plating lowers.

More preferably, crystals having grain sizes of not less than 10 nm are present by not less than $1 \times 10^7/mm^2$ and not more than $6 \times 10^9/mm^2$ on the average from the surfaces of the electroless Ni—P platings over portions where the metallized abrasive grains are present.

This density can be recognized by observing sections of the metallized abrasive grains with a TEM (transmission electron microscope). The quantity of adsorption of the abrasive grains can be rendered ideal by setting the density to not less than $1 \times 10^7/mm^2$ on the average, and a waste of the abrasive grains as well as a waste of electric power can be reduced.

A considerably long-term heat treatment is necessary so that the density exceeds $6 \times 10^9/mm^2$, and there is a possibility that the surfaces of the metallized abrasive grains are oxidized. If the same are oxidized, there is a possibility that fixation strength of the abrasive grains to the wire by nickel plating lowers.

Preferably, the ratio occupied by crystals having grain sizes of not less than 10 nm is not less than 20% and not more than 70% in the electroless platings upon observation of sections from the surfaces of the electroless Ni—P platings which are metal coating portions over portions where the metallized abrasive grains are present.

Within this range, the quantity of adsorption of the abrasive grains can be rendered ideal, and a waste of the abrasive grains as well as a waste of electric power can be reduced.

The quantity of adsorption of the abrasive grains to the wire is reduced if the ratio occupied by the crystals having grain sizes of not less than 10 nm is less than 20%, and the quantity of adsorption is slightly out of the ideal value.

If the ratio occupied by the crystals having grain sizes of not less than 10 nm exceeds 70%, a considerable heat treatment is necessary and there is a possibility that the surfaces of the metallized abrasive grains are oxidized. If the same are oxidized, there is a possibility that fixation strength of the abrasive grains to the wire by nickel plating lowers.

Preferably, the plating layer formed on the outer peripheral surface of the magnetic linear body is a nickel plating.

The nickel plating is so employed that the electrodeposited wire tool is supplied with corrosion resistance and hardness. Thus, the electrodeposited wire tool can withstand various service conditions in which the same is used.

Preferably, the average grain size of a nickel structure constituting the nickel plating is not less than 0.0155 times and not more than 1.000 time with respect to the thickness of the nickel plating. This can be recognized by EBSD-analyzing a section of the nickel plating. It is a value obtained by performing the analysis on condition that the respective ones of twin crystals are regarded as grain boundaries without including edge grains.

Thus, the plating is softened, and the quantities of incorporation of sulfur, oxygen and hydrogen hardening the plating into the plating themselves can be reduced. Thus, a nickel plating formed around a piano wire does not crack however often the same is extremely bent.

As an example of a condition for obtaining such a structure, there is the flow rate of a plating solution. In the relation between the flow rate of the plating solution and a current density, a value exceeding a flow rate obtained by the following equation is preferable:

The flow rate (L/min) of a plating solution necessary in a case of passing a piano wire in a container whose sectional area is X ($mm^2$) and performing nickel plating with a current density Y (A)=$X \times Y \times 6 \times 10^{-5}$ If the average grain size of the nickel structure is reduced below 0.0155 with respect to the thickness of the nickel plating, the plating itself is hardened and hence cracking is easily caused by bending.

If the average grain size of the nickel structure exceeds one time with respect to the thickness of the nickel plating, it is impossible that the grain size of a sectional structure exceeds the plating thickness.

The average grain size of the nickel structure mentioned here is obtained by averaging diameters of respective circles having areas equal to the areas of respective crystal grains obtained by EBSD (Electron Back Scatter Diffraction Patterns) analysis.

Preferably, the average content of S (sulfur) in the nickel plating is not more than 1 mass %.

In general, various stresses are applied to the electrodeposited wire tool in the use thereof. Thus, the nickel plating portion cracks, to result in destoning of the metallized abrasive grains and breaking of the tool. However, the plating is easily extendable if the average content of S (sulfur) in the nickel plating is set to not more than 1 mass %.

Even if a stress causing cracking is applied to such a nickel plating, the plating of the loaded portion so extends as to prevent occurrence of cracking, and neither destoning of the metallized abrasive grains nor breaking of the tool takes place.

Further, the electrodeposited wire tool is so flexible that the same can be smoothly wound on a pulley.

Preferably, the average content of S (sulfur) in the nickel plating is not less than 0 atoms/$cm^3$ and not more than $3.0 \times 10^{18}$ atoms/$cm^3$. With the aforementioned S content, the nickel plating formed around the piano wire does not crack however often the same is extremely bent. In general, the obtained nickel plating contains an extremely small quantity of sulfur even if no brightener of saccharin or the like is introduced. High sensitivity analysis such as SIMS can be listed as an analytical method, while a correct quantity cannot be detected by EDX-SEM (Energy Dispersive X-ray-Scanning Electron Microscope) or the like due to a measurement limit. X atoms/$cm^3$ correspond to $X \times 10^{-22} \times 100/9.14$ (mass %).

Nickel sulfate $NiSO_4 \cdot 6H_2O$ or nickel sulfamate $Ni(NH_2SO_3)_2 \cdot 4H_2O$ is generally used for a nickel plating solution, and these contain sulfur.

The inventor considers that the aforementioned extremely small quantity of sulfur is supplied by these. He considers that the manner of incorporation of sulfur into the plating is remarkably influenced by plating conditions, i.e., the properties of the formed plating structure. To take an example, there is the flow rate of the plating solution, and this is as described above.

Preferably, the average content of O (oxygen) in the nickel plating is not less than 0 atoms/cm$^3$ and not more than $2.0 \times 10^{20}$ atoms/cm$^3$.

This is also detected in an extremely small quantity by high sensitivity analysis such as SIMS. With the aforementioned oxygen content, the nickel plating formed around the piano wire does not crack however often the same is extremely bent.

It is conceivable that the main origins of oxygen are the plating solution and a deposit such as a hydroxide. The inventor considers that the manner of incorporation of oxygen into the plating solution is also remarkably influenced by the plating conditions and the properties of the formed plating structure. To take an example, the oxygen content depends on the flow rate of the plating solution, and a preferable flow rate of the plating solution is as described above.

Preferably, an average secondary ion strength ratio (average hydrogen strength/average Ni strength) between hydrogen and Ni is not less than 0 and less than $2.8 \times 10^{-2}$ when performing SIMS analysis in the nickel plating. Hydrogen is also detected in only an extremely small quantity by high sensitivity analysis such as SIMS. When the strength ratio between hydrogen in the nickel plating and secondary ions of nickel is in the aforementioned range, the plating solution formed around the piano wire does not crack however often the same is extremely bent.

It is conceivable that the main origins of hydrogen are hydrogen atoms in the plating solution and hydrogen gas generated from the wire. The manner of incorporation of hydrogen into the plating is also remarkably influenced by the plating solutions and the properties of the formed structure. To take an example, the manner of incorporation of hydrogen varies with the flow rate of the plating solution, and a preferable flow rate of the plating solution is as described above.

Preferably, the grain sizes of the metallized abrasive grains are not less than 5 μm and not more than 1000 μm.

Thus, the tool has excellent performance in sharpness, surface roughness of a cut surface, a swell of a workpiece, kerf loss and the like.

Preferably, the value of the thickness of the nickel plating/ the average grain size of the abrasive grains is not less than 0.26 and not more than 0.8 in the nickel plating and the metallized abrasive grains.

The electrodeposited wire tool satisfying this relation can maintain a state having high abrasive grain holding power and high sharpness over a long time.

Preferably, the magnetic linear body is a piano wire plated with brass or copper. In general, the piano wire must be dipped in an acid to remove an oxide film or the like before the piano wire is plated.

If a piano wire or the like is dipped in an acid, a deposit referred to as a smut mainly composed of carbon may be formed, and this reduces adhesive power of the plating. Therefore, a step of removing the smut is generally required after the acid dipping.

However, no smut is formed if the piano wire is plated with brass or copper, and hence the adhesive power can be kept high, and no excessive step may be introduced.

It is also possible to use a magnetic wire of Ni, an Ni alloy or stainless or a wire prepared by plating a nonmagnetic wire such as a W wire, an Mo wire, a Cu wire or a Cu alloy wire with a magnetic metal such as Ni as the material for the linear body in place of the piano wire, and a stranded wire prepared by stranding one or two of these wires may also be used.

The method of manufacturing an electrodeposited wire tool according to the present invention includes the steps of heat-treating metallized abrasive grains coated with electroless Ni—P platings and at least partially crystallizing the electroless Ni—P platings, introducing the heat-treated metallized abrasive grains into a plating solution and making a magnetic linear body which is a substrate adsorb the metallized abrasive grains in a dispersed state through magnetic force by magnetic induction and fixing the metallized abrasive grains by platings.

According to the method of manufacturing an electrodeposited wire tool comprising such steps, the electroless Ni—P platings are at least partially crystallized, whereby the Ni—P platings are easily magnetized. Consequently, the metallized abrasive grains can be easily adsorbed by the magnetic linear body by magnetic induction.

Preferably, the P content in the electroless Ni—P platings is not less than 4 mass %. As hereinabove described, metallized abrasive grains coated with electroless Ni—P platings of not less than 4 mass % are put on the market, and can be obtained at a low cost. If the magnetic linear body which is the substrate is made to adsorb the metallized abrasive grains put on the market through magnetic force, however, the quantity of adsorption of the metallized abrasive grains is extremely small, and the metallized abrasive grains cannot be used as such. This is because metal coatings are amorphous and hence the same are nonmagnetic. Particularly when an electrodeposited wire tool is produced at a production speed of not less than 2 m/min while employing commercially available metallized abrasive grains having grain sizes of not less than 10 μm, the quantity of adsorption of the metallized abrasive grains to the magnetic linear body remarkably lowers and hence the electrodeposited wire tool cannot be used.

While there has been such a problem, it has been rendered possible according to the present invention to magnetize metallized abrasive grains even if the metallized abrasive grains have a P content of not less than 4 mass % and are coated with amorphous and nonmagnetic electroless Ni—P platings, by heat-treating the same, at least partially crystallizing the Ni—P platings and supplying a magnetic field. Thus, the quantity of adsorption of the metallized abrasive grains to the magnetic linear body can be remarkably raised. Even if the P content is not more than 4 mass %, further, the heat treatment is so performed that the magnetism can be more improved than that before the heat treatment.

In addition, the specific resistance of the electroless Ni—P platings covering the metallized abrasive grains prepared through such a heat treatment is high as compared with Ni and electroless Ni—B platings, and hence a waste of the abrasive grains as well as a waste of electric power having been problematic in Patent Document 2 can be reduced.

More preferably, the content of P (phosphorus) in the electroless Ni—P platings is not less than 6 mass % and not more than 9 mass %. Within this range, a waste of the abrasive grains as well as a waste of electric power can be most reduced.

As methods of making the magnetic linear body adsorb the metallized abrasive grains through magnetic force, there are methods of (1) magnetizing only the metallized abrasive grains, (2) magnetizing only the magnetic linear body and (3)

magnetizing the metallized abrasive grains and the magnetic linear body, and any one may be employed.

As specific examples of the metallized abrasive grains subjected to the heat treatment, those prepared by coating diamond or CBN with electroless Ni—P platings can be listed.

Specific examples of the linear body are as described above.

Preferably, the temperature for the heat treatment is not less than 250° C. and not more than the melting point of the electroless Ni—P platings.

With this temperature range, crystallization of the electroless Ni—P platings suitable for the present invention can be performed, and the quantity of adsorption of the metallized abrasive grains is remarkably raised.

When the metallized abrasive grains coated with the electroless Ni—P platings are heat-treated, the Ni—P platings are also hardened. Thus, wear around the abrasive grains is suppressed, and the life of the electrodeposited wire tool can also be improved.

The temperature for the heat treatment is not less than 250° C. since the ratio of crystallization of the electroless Ni—P platings so lowers if the temperature is less than 250° C. that it is difficult to make the linear body adsorb the metal coatings through magnetic force. The temperature is set to not more than the melting point of the electroless Ni—P platings since the metallized abrasive grains are remarkably degenerated if the temperature exceeds the melting point.

Preferably, the atmosphere of the heat treatment is a vacuum atmosphere, a hydrogen atmosphere, a nitrogen atmosphere or an argon atmosphere (hereinafter referred to as a vacuum atmosphere or the like). If oxide films are present on the surfaces of the electroless Ni—P platings covering the abrasive grains, fixing power for the abrasive grains by the platings is reduced. If the metallized abrasive grains are heat-treated in a vacuum atmosphere or the like, oxide films are hardly formed, and the fixing power for the metallized abrasive grains can be increased.

More preferably, the metallized abrasive grains are dipped in an acid after the heat treatment. Even if oxide films are formed on the surfaces of the electroless Ni—P platings for some reason, the thicknesses of the oxide films can be removed by such a treatment, and fixing power for the metallized abrasive grains can be increased. More specifically, the metallized abrasive grains can be treated with hydrochloric acid, nitric acid or sulfuric acid.

MODES FOR CARRYING OUT THE INVENTION

Embodiments of the present invention are now described with reference to the drawings. In the following embodiments, portions identical or corresponding to each other are denoted by the same reference signs, and redundant description is not repeated. It is also possible to combine the respective embodiments with each other.

First Embodiment

Figure 1:
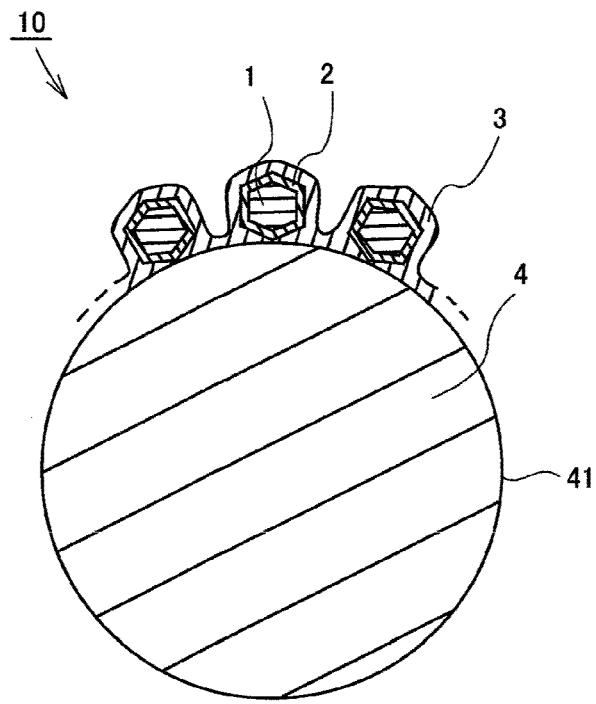
FIG. 1 is a sectional view orthogonal to a longitudinal direction in an electrodeposited wire tool according to a first embodiment of the present invention.

FIG. 1 is a sectional view orthogonal to a longitudinal direction in an electrodeposited wire tool according to a first embodiment of the present invention. Referring to FIG. 1, an electrodeposited wire tool 10 has a core wire 4 extending in the longitudinal direction, a plating layer 3 provided on an outer peripheral surface 41 of core wire 4, superabrasive grains 1 held by plating layer 3, and covering layers 2 covering the outer peripheral surfaces of superabrasive grains 1. A piano wire can be employed as core wire 4, for example. Superabrasive grains 1 are diamond abrasive grains or cubic boron nitride (CBN) abrasive grains.

Covering layers 2 are constituted of electroless Ni—P platings. Covering layers 2 are heat-treated, and the electroless Ni—P platings are partially or entirely crystallized. Heat-treated superabrasive grains 1 are introduced into a plating solution, adsorbed by core wire 4 which is a substrate through magnetic force in a dispersed state, and fixed by plating.

Second Embodiment

Figure 2:
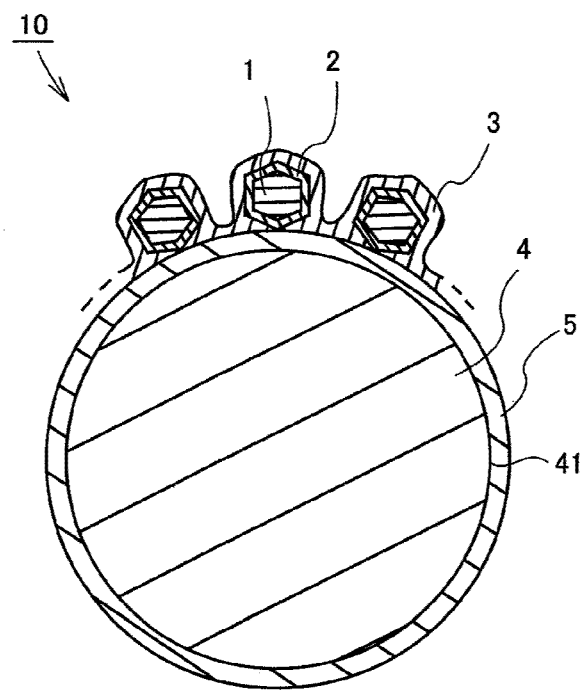
FIG. 2 is a sectional view orthogonal to a longitudinal direction in an electrodeposited wire tool according to a second embodiment of the present invention.

FIG. 2 is a sectional view orthogonal to a longitudinal direction in an electrodeposited wire tool according to a second embodiment of the present invention. Referring to FIG. 2, the electrodeposited wire tool according to the second embodiment of the present invention is different from the electrodeposited wire tool according to the first embodiment in a point that a covering layer 5 is formed on an outer peripheral surface 41 of a core wire 4. Covering layer 5 is formed by brass plating or copper plating.

The electrodeposited wire tool according to the second embodiment structured in this manner also has effects similar to those of the electrodeposited wire tool according to the first embodiment.

Third Embodiment

Figure 3:
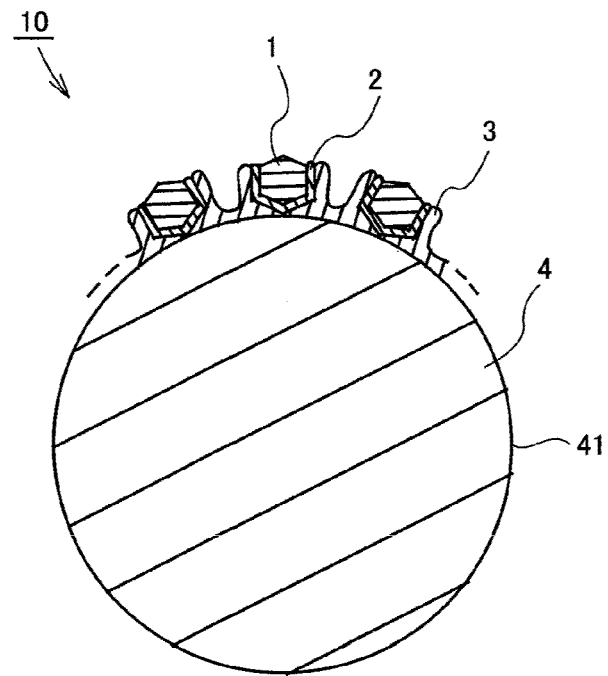
FIG. 3 is a sectional view orthogonal to the longitudinal direction, showing a form after dressing of an electrodeposited wire saw shown in FIG. 1.
Figure 4:
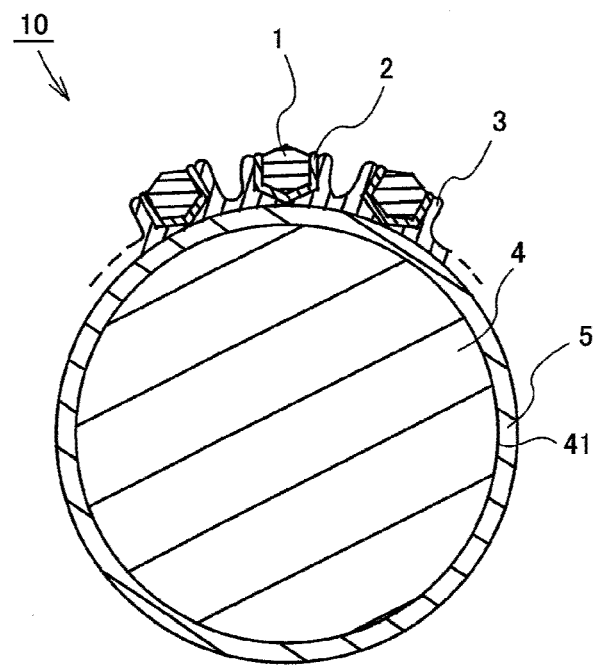
FIG. 4 is a sectional view orthogonal to the longitudinal direction, showing a form after dressing of an electrodeposited wire saw shown in FIG. 2.

FIG. 3 is a sectional view orthogonal to the longitudinal direction, showing a form after dressing of an electrodeposited wire saw shown in FIG. 1. FIG. 4 is a sectional view orthogonal to the longitudinal direction, showing a form after dressing of an electrodeposited wire saw shown in FIG. 2.

As shown in FIGS. 3 and 4, effects similar to those of the first and second embodiments are attained also when superabrasive grains 1 are exposed from covering layers 2.

Fourth Embodiment

Figure 5:
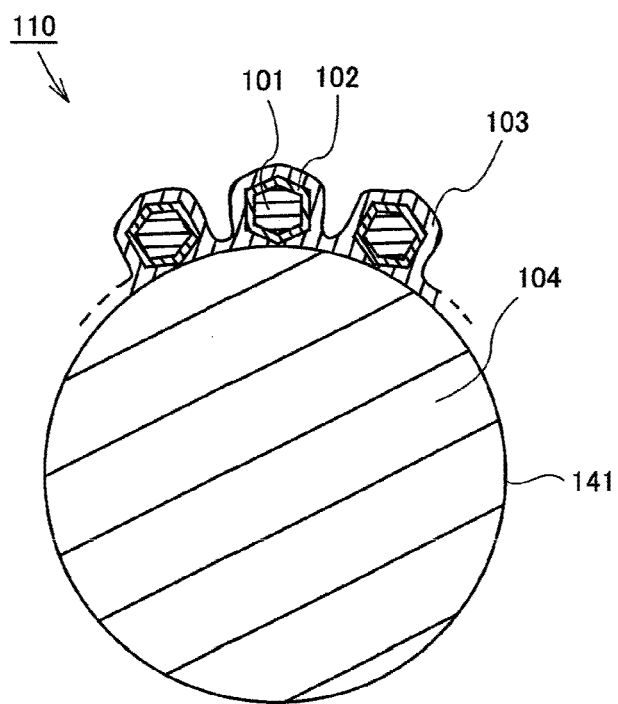
FIG. 5 is a sectional view orthogonal to a longitudinal direction in an electrodeposited wire tool according to a fourth embodiment of the present invention.

FIG. 5 is a sectional view orthogonal to a longitudinal direction in an electrodeposited wire tool according to a fourth embodiment of the present invention. Referring to FIG. 5, an electrodeposited wire tool 110 has a core wire 104 extending in the longitudinal direction, a plating layer 103 provided on an outer peripheral surface 141 of core wire 104, superabrasive grains 101 held by plating layer 103 and covering layers 102 covering the outer peripheral surfaces of superabrasive grains 101. The ratio of sulfur in nickel plating layer 103 is not more than 1 mass %. A piano wire can be employed as core wire 104, for example. Superabrasive grains 101 are diamond abrasive grains or cubic boron nitride (CBN) abrasive grains. Electrodeposited wire tool 110 can be manufactured by bringing superabrasive grains 101 into contact with core wire 104 without utilizing magnetic force.

Preferably, the average content of S (sulfur) in the nickel plating is not less than 0 atoms/cm$^3$ and not more than $3.0 \times 10^{18}$ atoms/cm$^3$. With the aforementioned S content, the nickel plating formed around the piano wire does not crack however often the same is extremely bent. In general, the obtained nickel plating contains an extremely small quantity of sulfur even if no brightener of saccharin or the like is introduced. High sensitivity analysis such as SIMS can be listed as an analytical method, while a correct quantity cannot be detected by EDX-SEM (Energy Dispersive X-ray-Scanning Electron Microscope) or the like due to a measurement limit.

Nickel sulfate $NiSO_4 \cdot 6H_2O$ or nickel sulfamate $Ni(NH_2SO_3)_2 \cdot 4H_2O$ is generally used for a nickel plating solution, and these contain sulfur.

The inventor considers that the aforementioned extremely small quantity of sulfur is supplied by these. He considers that the manner of incorporation of sulfur into the plating is remarkably influenced by the plating conditions, i.e., the properties of the formed plating structure. To take an example, there is the flow rate of the plating solution, and this is as described above.

The flow rate (L/min) of a plating solution necessary in a case of passing a piano wire in a container whose sectional area is X (mm$^2$) and performing nickel plating with a current density Y (A)=X×Y×6×10$^{-5}$ Preferably, the average content of O (oxygen) in the nickel plating is not less than 0 atoms/cm$^3$ and not more than $2.0 \times 10^{20}$ atoms/cm$^3$.

This is also detected in an extremely small quantity by high sensitivity analysis such as SIMS. With the aforementioned oxygen content, the nickel plating formed around the piano wire does not crack however often the same is extremely bent.

It is conceivable that the main origins of oxygen are the plating solution and a deposit such as a hydroxide. The inventor considers that the manner of incorporation of oxygen into the plating solution is also remarkably influenced by the plating conditions and the properties of the formed plating structure. To take an example, the oxygen content depends on the flow rate of the plating solution, and a preferable flow rate of the plating solution is as described above.

Preferably, an average secondary ion strength ratio (average hydrogen strength/average Ni strength) between hydrogen and Ni is not less than 0 and less than $2.8 \times 10^{-2}$ when performing SIMS analysis in the nickel plating. Hydrogen is also detected in only an extremely small quantity by high sensitivity analysis such as SIMS. When the strength ratio between hydrogen in the nickel plating and secondary ions of nickel is in the aforementioned range, the plating solution formed around the piano wire does not crack however often the same is extremely bent.

It is conceivable that the main origins of hydrogen are hydrogen atoms in the plating solution and hydrogen gas generated from the wire. The manner of incorporation of hydrogen into the plating is also remarkably influenced by the plating conditions and the properties of the formed structure. To take an example, the manner of incorporation of hydrogen varies with the flow rate of the plating solution, and a preferable flow rate of the plating solution is as described above.

More preferably, the average grain size of the nickel structure constituting the nickel plating is larger than 0.23 µm, if the plating thickness is 15 µm. This can be recognized by EDMS-analyzing a section of the nickel plating. It is a value obtained by performing the analysis on condition that the respective ones of twin crystals are regarded as grain boundaries without including edge grains.

Thus, the plating is softened, and the quantities of incorporation of sulfur, oxygen and hydrogen hardening the plating into the plating themselves can be reduced. Thus, the nickel plating formed around the piano wire does not crack however often the same is extremely bent.

As an example of a condition for obtaining such a structure, there is the flow rate of the plating solution. The relation between the flow rate of the plating solution and the current density is as described above.

Preferably, the abrasive grains are metallized.

Preferably, the grain sizes of the metallized abrasive grains are in the range of not less than 5 µm and not more than 1000 µm.

The tool has excellent performance in sharpness, surface roughness of a cut surface, a swell of a workpiece, kerf loss and the like due to such grain sizes.

Preferably, the value of the thickness of the nickel plating/ the average grain size of the abrasive grains is not less than 0.26 and not more than 0.8 in the nickel plating and the metallized abrasive grains.

The electrodeposited wire tool satisfying this relation can maintain a state having high abrasive grain holding power and high sharpness over a long time.

Fifth Embodiment

Figure 6:
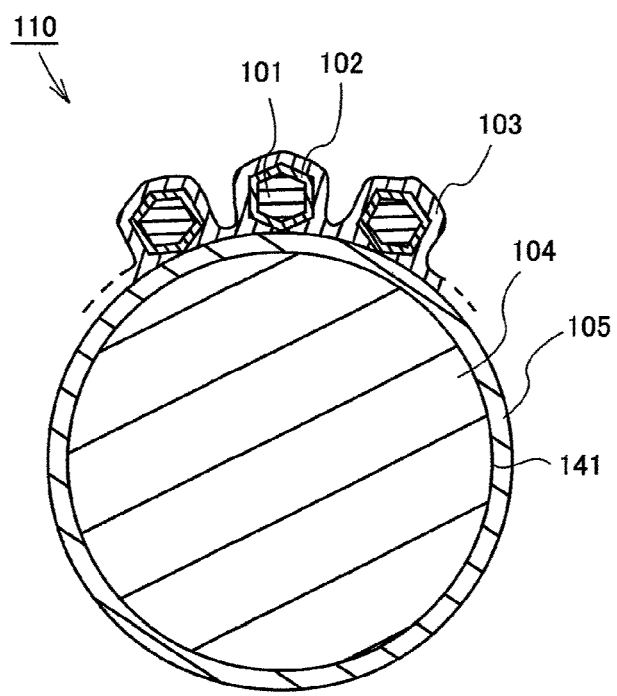
FIG. 6 is a sectional view orthogonal to a longitudinal direction in an electrodeposited wire tool according to a fifth embodiment of the present invention.

FIG. 6 is a sectional view orthogonal to a longitudinal direction in an electrodeposited wire tool according to a fifth embodiment of the present invention. Referring to FIG. 6, the electrodeposited wire tool according to the fifth embodiment of the present invention is different from the electrodeposited wire tool according to the fourth embodiment in a point that a covering layer 105 is formed on an outer peripheral surface 141 of a core wire 104. Covering layer 105 is formed by brass plating or copper plating.

The electrodeposited wire tool according to the fifth embodiment structured in this manner also has effects similar to those of the electrodeposited wire tool according to the fourth embodiment.

Sixth Embodiment

Figure 7:
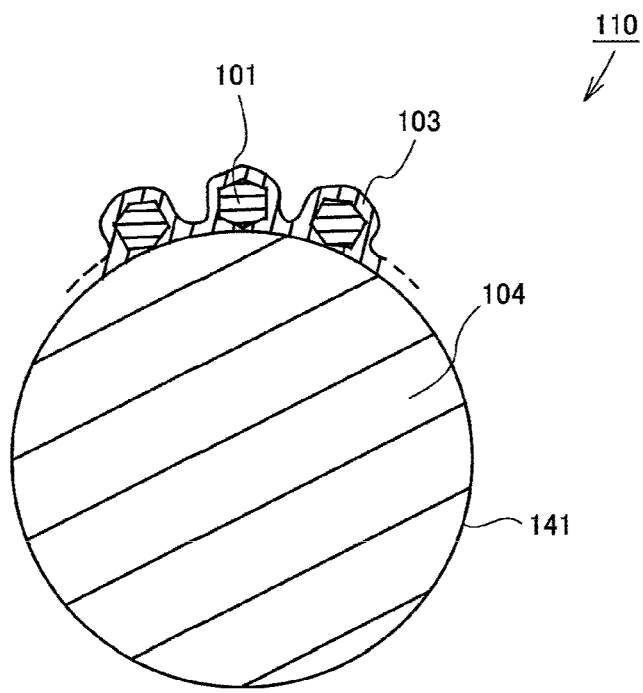
FIG. 7 is a sectional view orthogonal to a longitudinal direction in an electrodeposited wire tool according to a sixth embodiment of the present invention.

FIG. 7 is a sectional view orthogonal to a longitudinal direction in an electrodeposited wire tool according to a sixth embodiment of the present invention. Referring to FIG. 7, an electrodeposited wire tool 110 according to the sixth embodiment of the present invention is different from the electrodeposited wire tool according to the fourth embodiment in a point that no covers are provided on the outer peripheries of superabrasive grains 101.

The electrodeposited wire tool according to the sixth embodiment structured in this manner also has effects similar to those of the electrodeposited wire tool according to the fourth embodiment.

Seventh Embodiment

Figure 8:
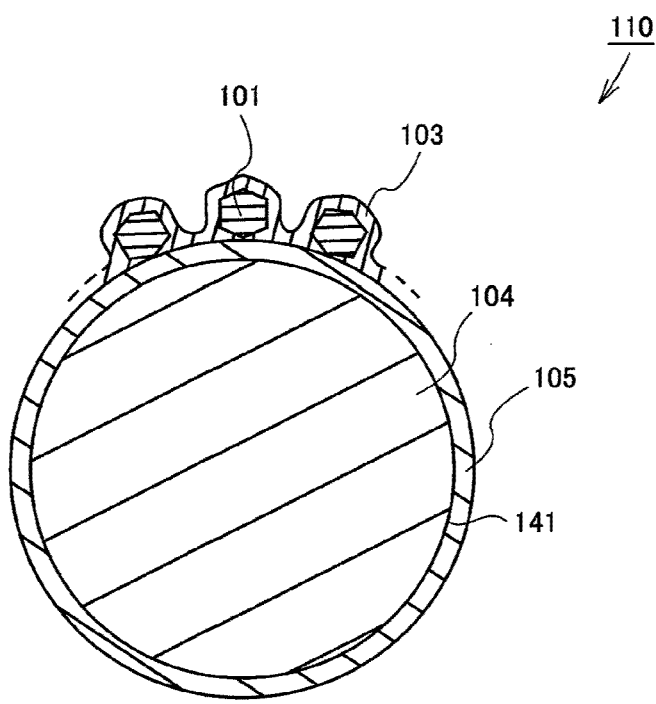
FIG. 8 is a sectional view orthogonal to a longitudinal direction in an electrodeposited wire tool according to a seventh embodiment of the present invention.

FIG. 8 is a sectional view orthogonal to a longitudinal direction in an electrodeposited wire tool according to a seventh embodiment of the present invention. Referring to FIG. 8, the electrodeposited wire tool according to the seventh embodiment of the present invention is different from the electrodeposited wire tool according to the sixth embodiment in a point that a covering layer 105 is formed on an outer peripheral surface 141 of a core wire 104.

The electrodeposited wire tool according to the seventh embodiment structured in this manner also has effects similar to those of the electrodeposited wire tool according to the sixth embodiment.

Eighth Embodiment

Figure 9:
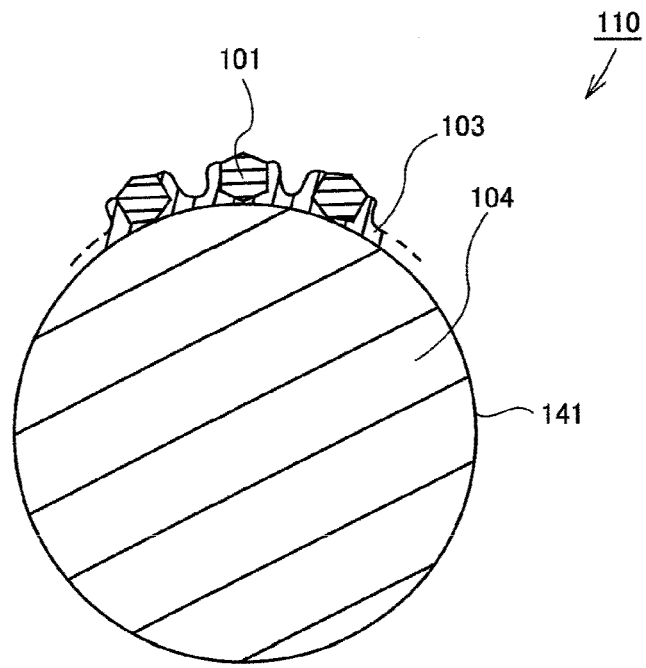
FIG. 9 is a sectional view orthogonal to a longitudinal direction in an electrodeposited wire tool according to an eighth embodiment of the present invention.

FIG. 9 is a sectional view orthogonal to a longitudinal direction in an electrodeposited wire tool according to an eighth embodiment of the present invention. Referring to FIG. 9, an electrodeposited wire tool 110 according to the eighth embodiment of the present invention is different from the electrodeposited wire tool according to the seventh embodiment in a point that the surfaces of superabrasive grains 101 are exposed.

The electrodeposited wire tool according to the eighth embodiment structured in this manner also has effects similar to those of the electrodeposited wire tool according to the fourth embodiment.

As a method of exposing the surfaces of superabrasive grains 1 in FIG. 9, a method of reducing the thickness of a plating layer 103 or a method of temporarily forming a plating similarly to the sixth embodiment and thereafter removing part of plating layer 103 can be listed.

Ninth Embodiment

Figure 10:
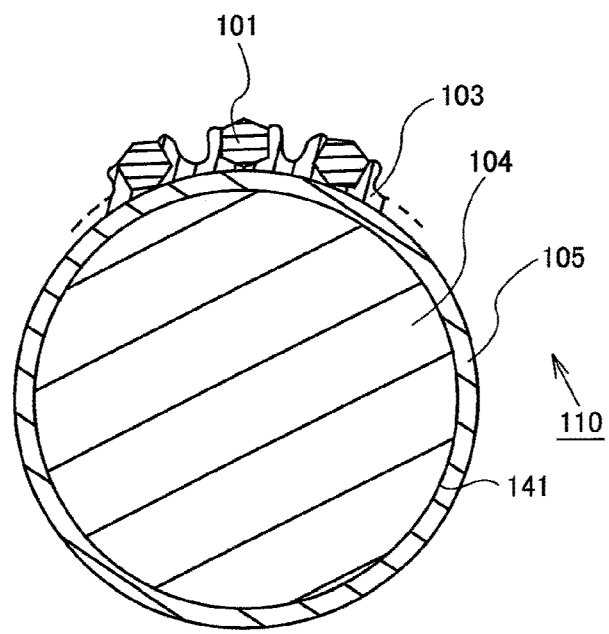
FIG. 10 is a sectional view orthogonal to a longitudinal direction in an electrodeposited wire tool according to a ninth embodiment of the present invention.

FIG. 10 is a sectional view orthogonal to a longitudinal direction in an electrodeposited wire tool according to a ninth embodiment of the present invention. Referring to FIG. 10, an electrodeposited wire tool 110 according to the ninth embodiment of the present invention is different from the electrodeposited wire tool according to the eighth embodiment in a point that a covering layer 105 is formed on an outer peripheral surface 141 of a core wire 104.

The electrodeposited wire tool according to the ninth embodiment structured in this manner has effects similar to those of the electrodeposited wire tool according to the eighth embodiment.

Example 1

Diamond abrasive grains coated with electroless Ni—P platings having P contents of 3 mass %, 5 mass %, 7 mass %, 9 mass % and 11 mass % were prepared.

The central diameter of the grain size distribution of the diamond abrasive grains is 29 μm, and the ratio of the electroless Ni—P platings in the overall abrasive grains is 30 mass %. A laser diffraction grain size distribution measuring apparatus (Mastersizer S Ver. 2.19) by Malvern Instruments Ltd. was used for measuring the grain sizes of the diamond abrasive grains.

The abrasive grains were halved respectively, and first groups were heat-treated in a vacuum at a temperature of 300° C. for two hours. Second groups were not treated at all.

Electrodeposited wire tools were prepared by introducing these abrasive grains into an Ni sulfamate bath, making brassed piano wires of 0.18 mm in diameter ϕ which are substrates adsorb the abrasive grains in a dispersed state through magnetic force and fixing the abrasive grains by nickel platings.

All production speeds (linear speeds) were set to a constant level of 2 m/min.

Results of comprehensively evaluating abrasive grain densities and productivities of the obtained electrodeposited wires are shown below. "Productivity is excellent" indicates that there is neither a waste of abrasive grains nor a waste of electric power.

⊚ and ○ in the following Table denote that the electrodeposited wire tools are acceptable. However, ⊚ denotes that the electrodeposited wire tools are in states superior to those of ○. × denotes that the electrodeposited wire tools are problematic.

TABLE 1

| P Content (mass %) | 3 | 5 | 7 | 9 | 11 |
|---|---|---|---|---|---|
| Abrasive grains heat-treated | ○ (Inventive Sample 1) | ○ (Inventive Sample 2) | ⊚ (Inventive Sample 3) | ⊚ (Inventive Sample 4) | ○ (Inventive Sample 5) |
| Abrasive grains not heat-treated | X (Comparative Sample 1) | X (Comparative Sample 2) | X (Comparative Sample 3) | X (Comparative Sample 4) | X (Comparative Sample 5) |

Most excellent results were obtained in the inventive samples 4 and 3 in abrasive grain density and productivity.

The inventive samples 1, 2 and 5 were slightly inferior in productivity and abrasive grain density as compared with the inventive samples 3 and 4. However, these samples were merely slightly inferior, remarkably improved as compared with the prior art, and unchangeably remain extremely excellent.

The comparative sample 1 was problematic in productivity, although the abrasive grain density was increasable. The comparative samples 2 to 5 were unusable as electrodeposited wire tools, due to low abrasive grain densities.

Example 2

While an electrodeposited wire tool was manufactured by replacing the diamond abrasive grains with those having a central diameter of a grain size distribution of 41 μm and a ratio of electroless Ni—P platings of 55 mass % in the overall abrasive grains, effects of the present invention were attained similarly to Example 1.

Example 3

While an electrodeposited wire tool was prepared by changing the plating bath to a Watt bath, effects similar to those of Example 1 were attained.

Example 4

Diamond abrasive grains, having a central diameter of a grain size distribution of 29 μm, coated with electroless Ni—P platings having a P content of 7 mass % were prepared. The ratio of the electroless Ni—P platings in the overall abrasive grains is 30 mass %.

The diamond abrasive grains were heat-treated in a hydrogen atmosphere at a temperature of 280° C. for two hours.

Two types of plating solutions were prepared by adding 0.1 g/dm$^3$ of sodium saccharate to a Watt bath (inventive sample 6) and by adding no sodium saccharate (inventive sample 7) respectively. Electrodeposited wire tools were prepared by introducing the heat-treated diamond abrasive grains into the respective plating solutions, making brassed piano wires of 0.18 mm in diameter φ which are substrates adsorb the abrasive grains in a dispersed state through magnetic force and fixing the abrasive grains by nickel platings (Ni platings). The production speeds (linear speeds) were set to 2 m/min. in both cases.

The electrodeposited wires obtained from the plating solutions prepared by adding 0.1 g/dm$^3$ of sodium saccharate to the Watt bath and by adding no sodium saccharate were regarded as inventive samples 6 and 7 respectively. When the weight ratios of sulfur (S) contained in the respective nickel platings were subjected to qualitative/quantitative analysis with an EDX-SEM (Energy Dispersive X-ray Spectrometer-Scanning Electron Microscope), the ratios of sulfur were 2 mass % in the inventive sample 5 and 0 mass % in the inventive sample 6.

These were wound on pulleys, and levels of easiness of winding thereof were compared with each other. While the inventive sample 7 was excellent in flexibility and smooth to wind, the inventive sample 6 was inferior in flexibility as compared with the inventive sample 7, and hard to wind.

Example 5

Diamond abrasive grains having a central diameter of a grain size distribution of 29.82 μm were prepared. The laser diffraction grain size distribution measuring apparatus (Mastersizer S Ver. 2.19) by Malvern Instruments Ltd. was used for measuring the grain sizes of the diamond abrasive grains. The diamond abrasive grains were coated with electroless Ni-8 wt. % P platings to occupy 30% of the whole in weight percentage. The aforementioned diamond abrasive grains were introduced into a vacuum sintering furnace, and heat-treated at a pressure of not more than $1\times10^{-4}$ Torr and a temperature of 300° C. for 10 hours.

Figure 11:
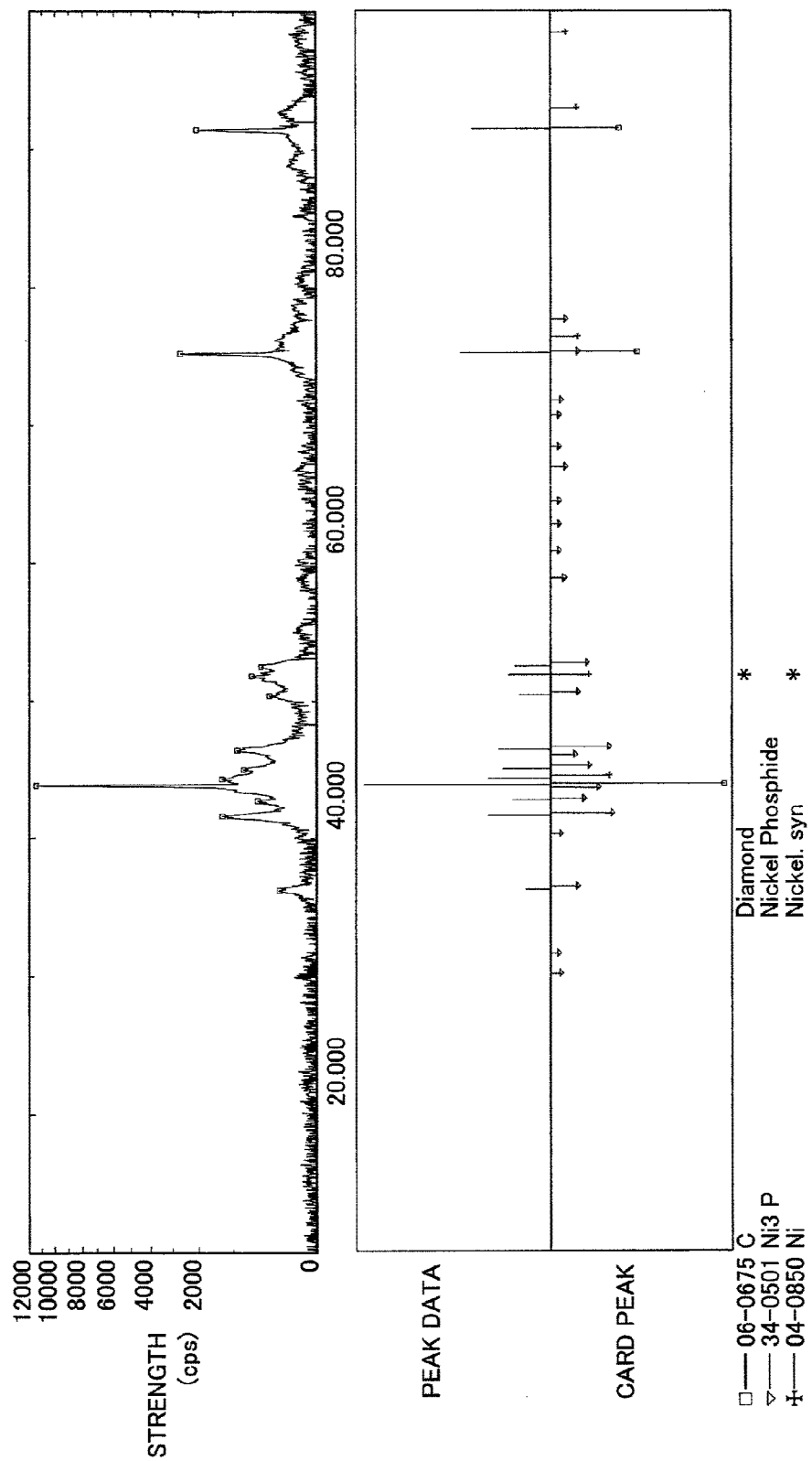
FIG. 11 is a diagram showing an XRD chart of diamond abrasive grains heat-treated by a method described in Example 5.
Figure 12:
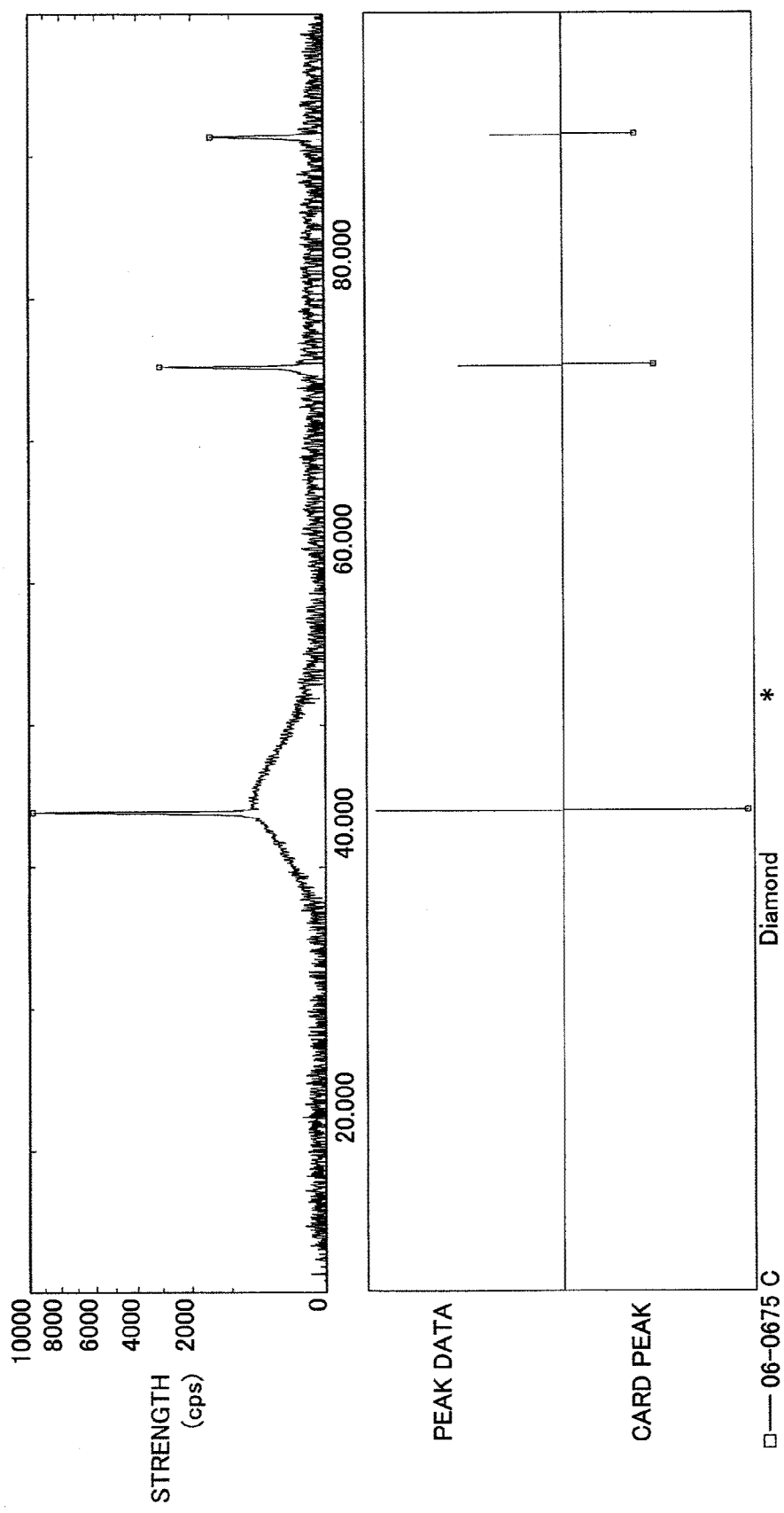
FIG. 12 is a diagram showing an XRD chart of diamond abrasive grains not heat-treated by the method described in Example 5.

FIG. 11 shows an XRD chart as to the abrasive grains after the heat treatment. FIG. 12 shows an XRD chart of abrasive grains not subjected to a heat treatment. An XRD analyzer (RINT 2000) by Rigaku Corporation was used for the XRD charts. A strength ratio Ni$_3$P(231)/Dia(111) of the heat-treated abrasive grains by XRD analysis was 0.11. That of the abrasive grains not subjected to a heat treatment was zero.

Figure 13:
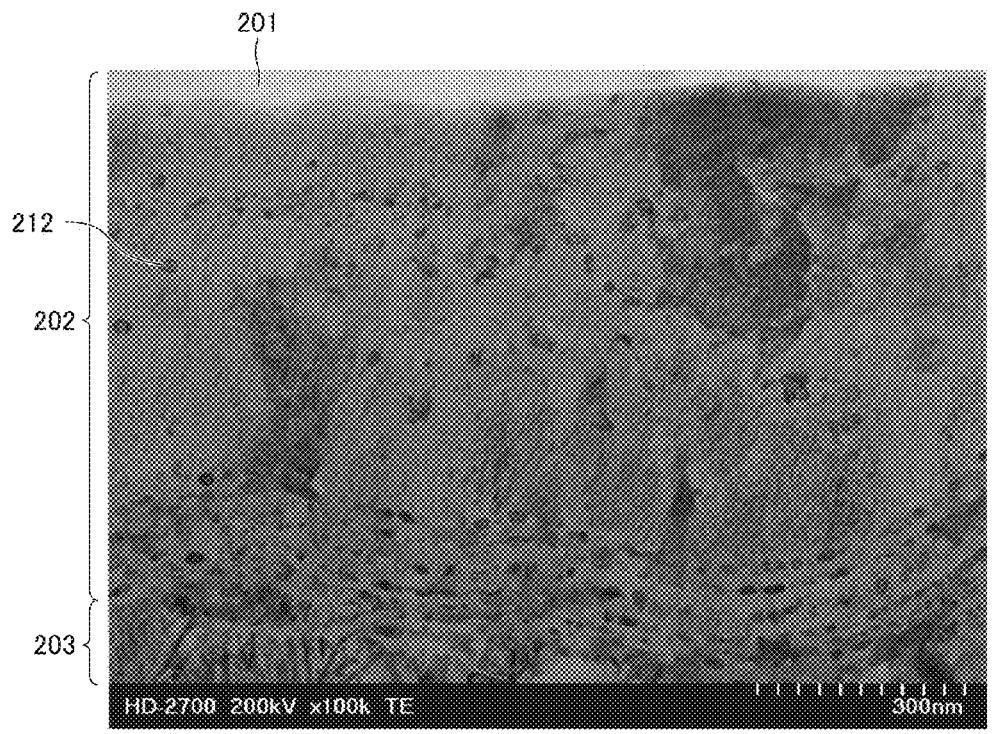
FIG. 13 is a diagram showing sectional portions of this diamond abrasive grain and an electroless Ni—P plating with a scanning transmission electron microscope (HD-2700) by Hitachi High-Technologies Corporation.
Figure 14:
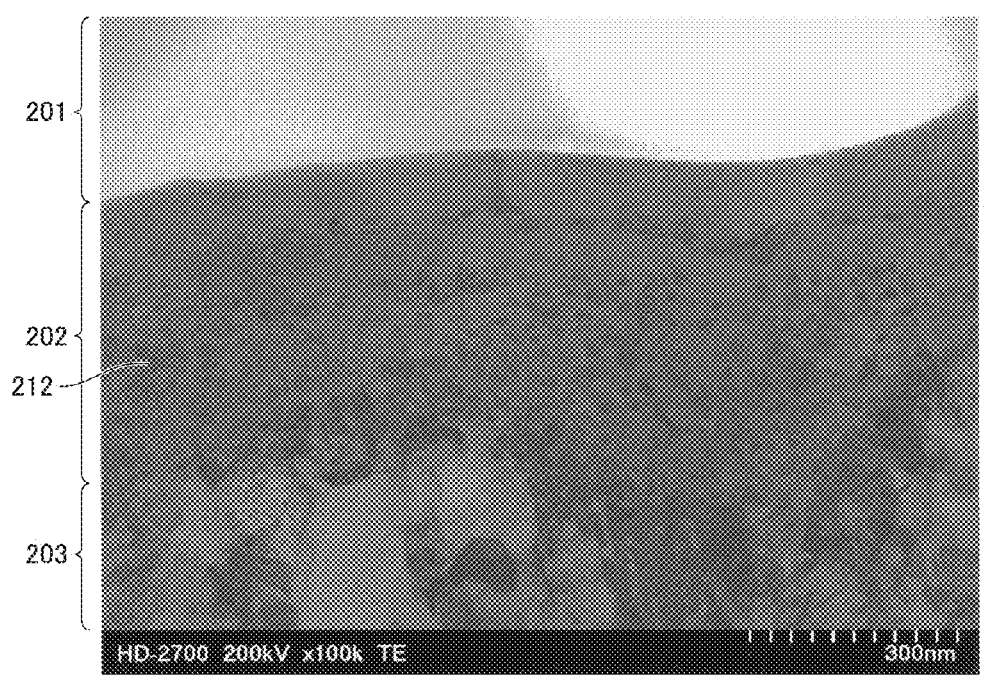
FIG. 14 is a diagram showing the sectional portions of this diamond abrasive grain and the electroless Ni—P plating with the scanning transmission electron microscope (HD-2700) by Hitachi High-Technologies Corporation.

FIGS. 13 and 14 are diagrams showing sectional portions of this diamond abrasive grain and the electroless Ni—P plating with a scanning transmission electron microscope (HD-2700) by Hitachi High-Technologies Corporation. FIGS. 13 and 14 are sectional views of different positions of the same sample. As shown in FIGS. 13 and 14, an electroless Ni—P layer 202 and a diamond layer 201 are stacked on a nickel plating layer 203. Crystals 212 shown by black spots were observed in Ni—P layer 202. Crystals 212 have magnetism, and include Ni—P crystals and Ni crystals. The sample was laminated with an FIB (Focused Ion Beam) so that sections of the diamond abrasive grain provided with the electroless Ni—P plating in the prepared electrodeposited wire tool which is the inventive sample could be observed, and observed at an acceleration voltage of 200 kV and a magnification of 100000. The black spot portions are crystals defining the present invention.

The number of crystals having diameters of not less than 10 nm was $6\times10^7$/mm$^2$.

The ratio of the black spot crystals occupying the whole was 45%.

Figure 15:
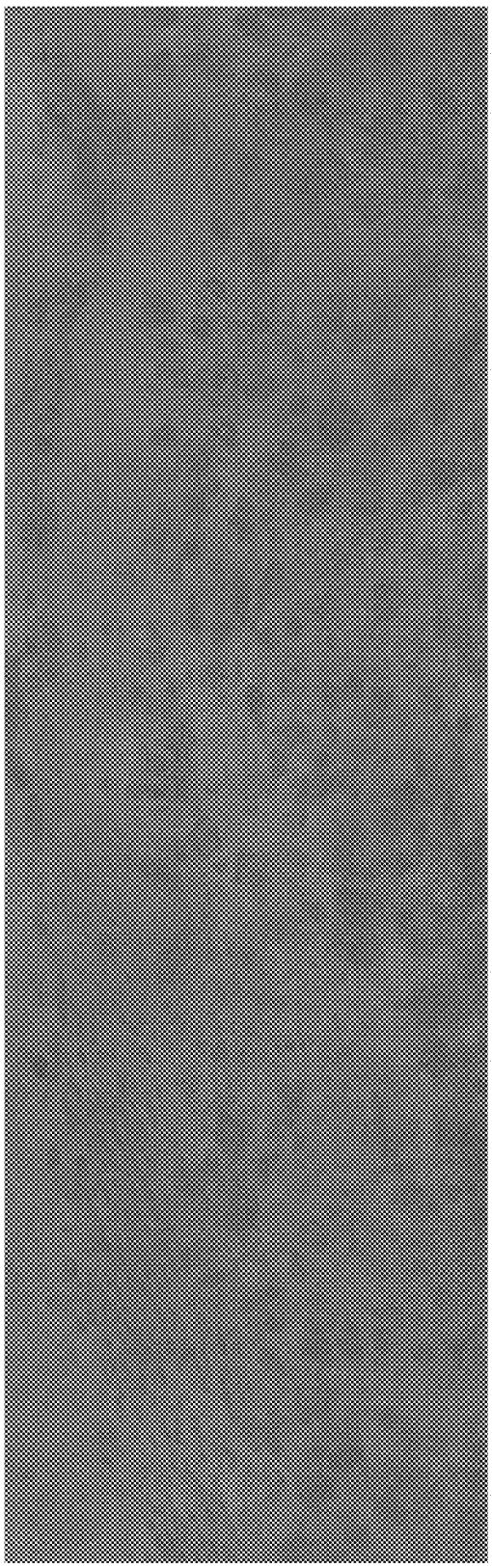
FIG. 15 is a sectional view showing an electroless Ni—P layer 202 in an enlarged manner in a sample of FIG. 14.
Figure 16:
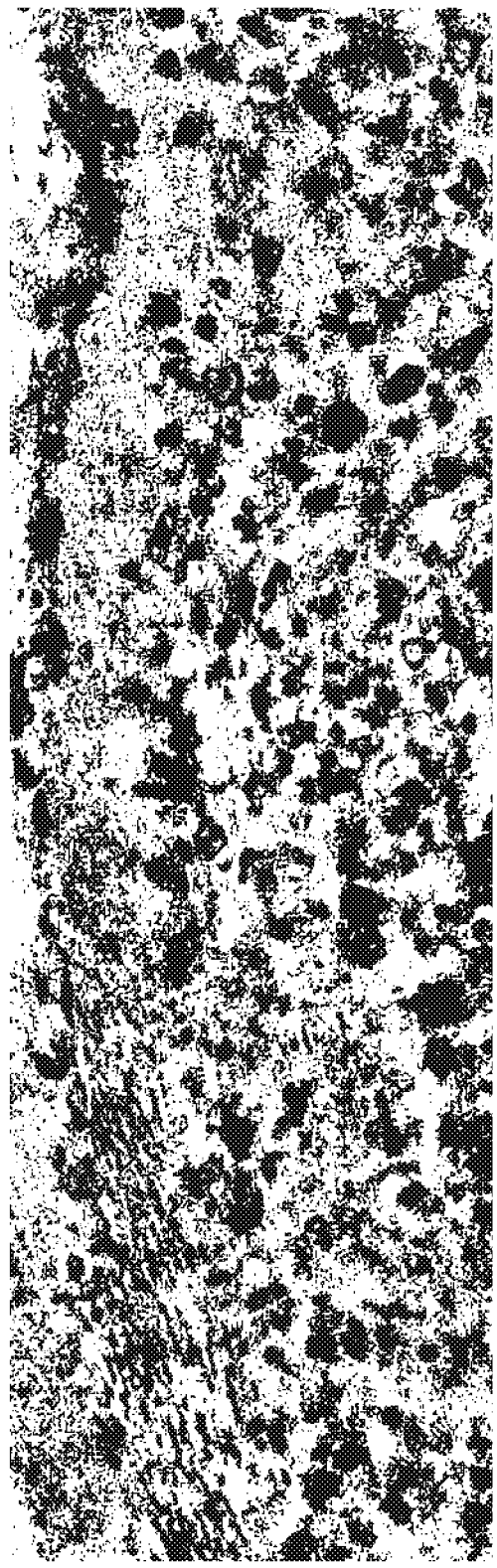
FIG. 16 is a sectional view showing crystal portions and amorphous portions in black and white respectively in the photograph shown in FIG. 15.

FIG. 15 is a sectional view showing electroless Ni—P layer 202 in the sample of FIG. 14 in an enlarged manner. FIG. 16 is a sectional view showing crystal portions and amorphous portions in black and white respectively in the photograph shown in FIG. 15.

The aforementioned calculations were made by fetching the aforementioned TEM image, rendering the black spot crystal portions and the amorphous portions black and white respectively as shown in FIG. 16, and binarizing the same. Software named Microsoft Photo Editor AT Image Ver 4.5, Lia 32 Ver. 0.376β1 was used for the aforementioned operation.

Then, three types of nickel sulfamate plating solutions shown in Table 2 were prepared, and the diamond abrasive grains were introduced into the same respectively.

TABLE 2

| | Nickel Sulfamate | Nickel Chloride | Boric Acid | Brightener |
|---|---|---|---|---|
| Example A | 550 g/dm$^3$ | 5 g/dm$^3$ | 30 g/dm$^3$ | Not included |
| Example B | 450 g/dm$^3$ | 5 g/dm$^3$ | 30 g/dm$^3$ | Not included |
| Example C | 550 g/dm$^3$ | 5 g/dm$^3$ | 30 g/dm$^3$ | Included |

The prepared abrasive grains were introduced into the aforementioned plating solutions, and dispersed. Then, electrodeposited wire tools were prepared by making brassed piano wires of 0.18 mm in diameter φ which are substrates adsorb the abrasive grains through magnetic force and fixing the abrasive grains by nickel platings.

Each plating solution was fed at a flow rate of 8 dm$^3$/min into a container having a sectional area of 2000 mm$^2$ at a current density of 50 A/dm$^3$.

All plating thicknesses were set to 15 μm.

10 samples were prepared by cutting each of the aforementioned two types of wires into 30 mm.

The respective ones were first bent to 180 degrees.

The nickel platings did not crack in all samples of Examples A and B.

The nickel platings remarkably cracked in all samples of Example C. When the respective samples were quantitatively analyzed with an EDX-SEM, the following results were obtained:

Example A sulfur: detectable only at an error level.

Example B sulfur: detectable only at an error level.

Example C sulfur: 1.5 mass

Thereafter the wires bent in the aforementioned manner were temporarily restored and further bent to 180 degrees again to evaluate presence or absence of cracking of the nickel platings as to Examples A and B.

The results were as follows:

Zero in 10 cracked in Example A.

Five in 10 cracked in Example B.

Table 3 shows results obtained by observing the samples of Example A with an EBSD apparatus (OIM) by TSL and a scanning electron microscope (JSM-7001F) by JEOL Ltd.

TABLE 3

| Diameter (μm) | Number |
| --- | --- |
| 0.1 | 147 |
| 0.3 | 71 |
| 0.5 | 20 |
| 0.7 | 7 |
| 0.9 | 4 |
| 1.1 | 2 |
| 1.3 | 0 |
| 1.5 | 1 |
| 1.7 | 1 |
| 1.9 | 0 |
| 2.1 | 0 |
| 2.3 | 0 |
| 2.5 | 0 |
| 2.7 | 0 |
| 2.9 | 1 |
| 3.1 | 0 |
| 3.3 | 0 |
| 3.5 | 0 |
| 3.7 | 0 |
| 3.9 | 1 |
| 4.1 | 0 |
| 4.3 | 0 |
| 4.5 | 0 |
| 4.7 | 0 |
| 4.9 | 0 |
| Average Grain Size (μm) | 0.261735 |

The samples were treated by ion polishing so that sections of the nickel platings in the prepared electrodeposited wire tools which are inventive samples could be observed, and the EBSD measurement was performed at an acceleration voltage of 20 kV and a measurement step of 0.03 μm, while the SEM observation was made at an acceleration voltage of 20 kV or 10 kV. The average grain size was calculated by EBSD analysis on condition that the respective ones of twin crystals were regarded as grain boundaries without including edge grains.

Table 4 shows results obtained by observing the samples of Example B with the EBSD apparatus (OIM) by TSL and the scanning electron microscope (JSM-7001F) by JEOL Ltd. under a similar condition.

TABLE 4

| Diameter (μm) | Number |
| --- | --- |
| 0.1 | 356 |
| 0.3 | 133 |
| 0.5 | 27 |
| 0.7 | 9 |
| 0.9 | 5 |
| 1.1 | 2 |
| 1.3 | 3 |
| 1.5 | 0 |
| 1.7 | 0 |
| 1.9 | 0 |
| 2.1 | 0 |
| 2.3 | 1 |
| 2.5 | 0 |
| 2.7 | 0 |
| 2.9 | 0 |
| 3.1 | 0 |
| 3.3 | 1 |
| 3.5 | 0 |
| 3.7 | 0 |
| 3.9 | 0 |
| 4.1 | 0 |
| 4.3 | 0 |
| 4.5 | 0 |
| 4.7 | 0 |
| 4.9 | 0 |
| Average Grain Size (μm) | 0.210398 |

Figure 17:
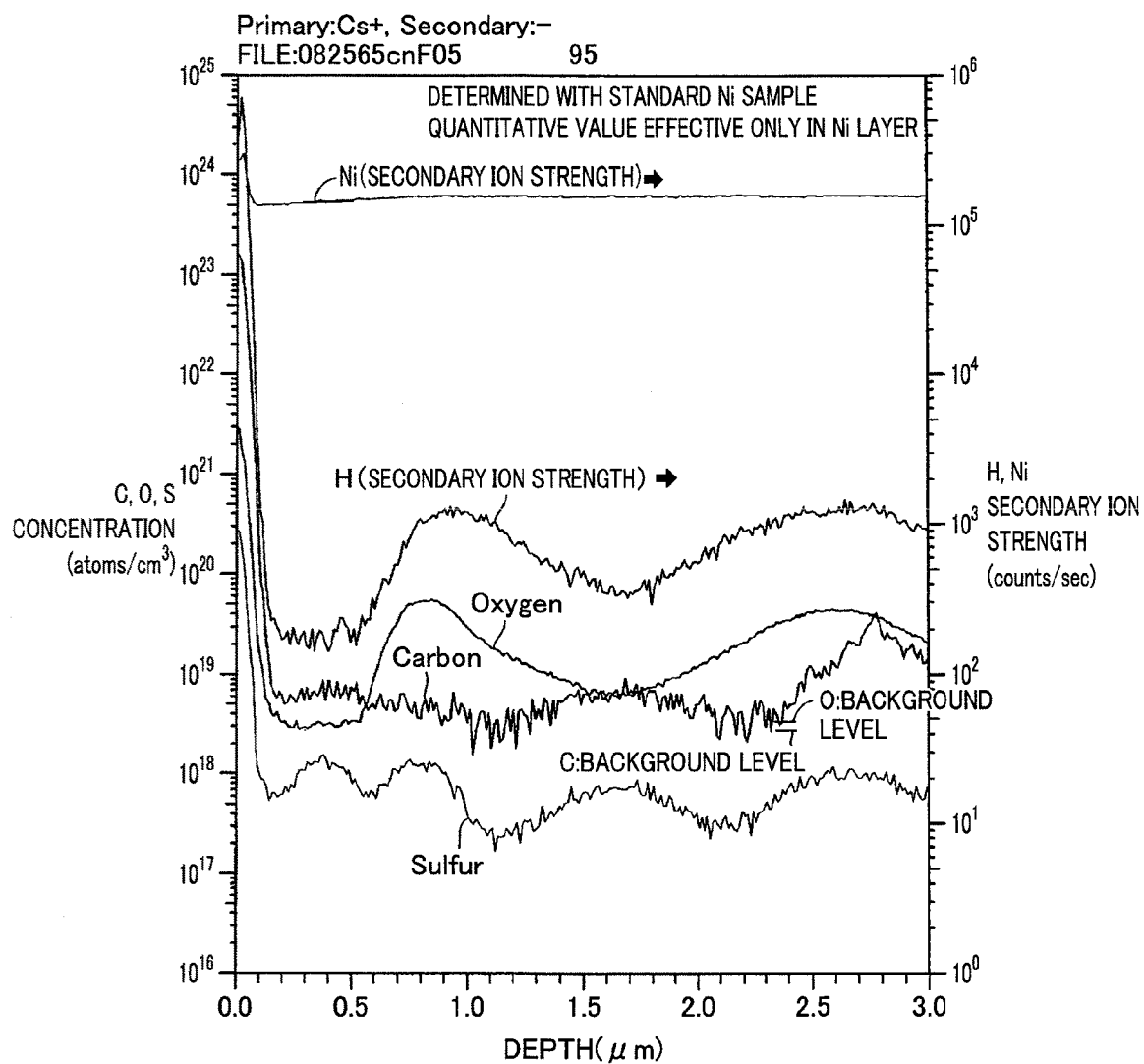
FIG. 17 is a graph showing results of SIMS analysis of nickel platings formed on wires according to Example A.

FIG. 17 is a graph showing results of SIMS analysis of the nickel platings formed on the wires according to Example A.

Figure 18:
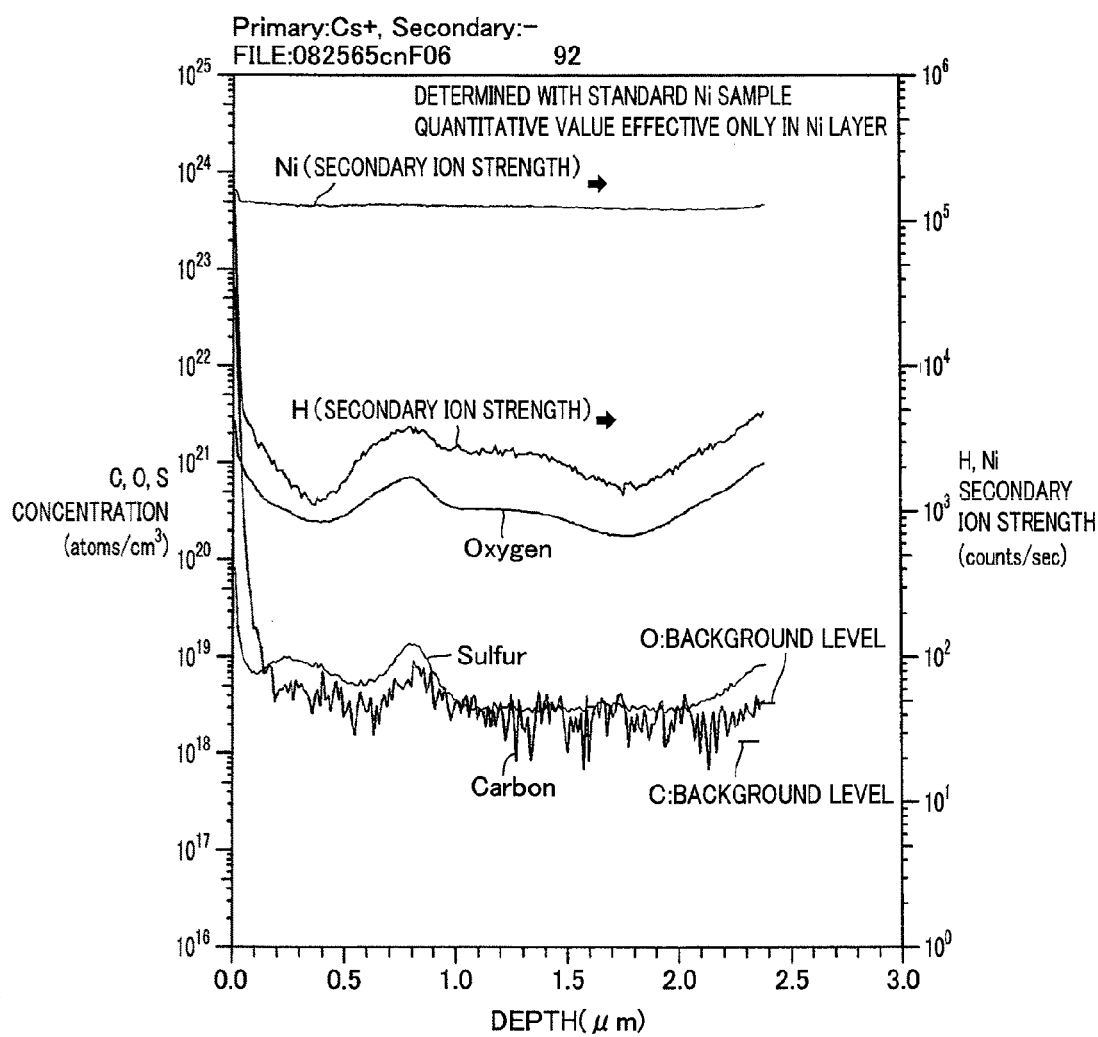
FIG. 18 is a graph showing results of SIMS analysis of nickel platings formed on wires according to Example B.

FIG. 18 is a graph showing results of SIMS analysis of the nickel platings formed on the wires according to Example B.

FIGS. 17 and 18 show examples measured with an SIMS apparatus (IMS-7F) by CAMECA. These results of measurement were obtained by digging the prepared electrodeposited wire tools which are the inventive samples up to depths of 2.5 μm from the nickel plating surfaces with cesium ions.

Average values in portions subsequent to those of 0.5 μm in depth from the surfaces are shown below. Portions up to those of 0.5 μm in depth from the surfaces were excluded in consideration of low accuracy of measured values.

Example A

Sulfur: $5.0 \times 10^{17}$ atoms/cm$^3$

Oxygen: $2.0 \times 10^{19}$ atoms/cm$^3$

Average strength ratio (hydrogen average/nickel average) of secondary ions: $5.6 \times 10^{-3}$ Average grain size of nickel grains: 0.26 μm Example B Sulfur: $6.0 \times 10^{18}$ atoms/cm$^3$ Oxygen: $4.0 \times 10^{20}$ atoms/cm$^3$ Average strength ratio (hydrogen average/nickel average) of secondary ions: $2.7 \times 10^{-2}$ Average grain size of nickel grains: 0.21 μm Example 6

Diamond abrasive grains having a central diameter of a grain size distribution of 29.82 μm were prepared. The laser diffraction grain size distribution measuring apparatus (Mastersizer S Ver. 2.19) by Malvern Instruments Ltd. was used for measuring the grain sizes of the diamond abrasive grains.

The diamond abrasive grains are coated with electroless Ni-8 mass % P platings to occupy 30% of the whole in mass percentage. The diamond abrasive grains were introduced into a vacuum incinerator, and heat-treated at a pressure of not more than 1×10⁻⁴ Torr and a temperature of 300° C. for 10 hours.

A nickel sulfamate plating solution was prepared and the diamond abrasive grains were introduced thereinto. The prepared abrasive grains were introduced into the aforementioned plating solution, and dispersed. Electrodeposited wire tools were prepared by making brassed piano wires of 0.18 mm in diameter ϕ which are substrates adsorb the abrasive grains through magnetic force and fixing the abrasive grains by nickel platings.

Plating thicknesses were set to 6 μm, 8 μm, 10 μm, 15 μm, 22 μm and 25 μm.

These were mounted on a cutter, to cut three sapphire members of ϕ2 inches with each wire tool.

While each of the wire tools having the plating thicknesses of 8 μm, 10 μm, 15 μm and 22 μm was usable also after cutting the three members, those having the plating thicknesses of 6 μm and 25 μm were reduced in sharpness it was hard to thereafter use the same.

As the reason therefor, the diamond abrasive grains partially fell in the wire tool having the plating thickness of 6 μm. This is conceivably because the nickel platings supporting the diamond abrasive grains were thin. As to the wire tool having the plating thickness of 25 μm, the diamond abrasive grains did not fall but the diamond was so worn in use that portions protruding from the nickel platings disappeared.

Example 7

Diamond abrasive grains having a central diameter of a grain size distribution of 29.82 μm were prepared. The laser diffraction grain size distribution measuring apparatus (Mastersizer S Ver. 2.19) by Malvern Instruments Ltd. was used for measuring the grain sizes of the diamond abrasive grains.

Electrodeposited wire tools were prepared by introducing these abrasive grains into a Watt bath, utilizing composite plating in a dispersed state and fixing the abrasive grains to brassed piano wires of 0.18 mm in diameter ϕ by nickel platings.

Two types of plating solutions were prepared by adding 1 g/dm³ of sodium saccharate to the Watt bath and by adding no sodium saccharate respectively.

The electrodeposited wires obtained from the plating solutions prepared by adding 1 g/dm³ of sodium saccharate to the Watt bath and by adding no sodium saccharate were regarded as a comparative sample 1 and an inventive sample 1 respectively. When the weight ratios of sulfur (S) contained in the respective nickel platings were subjected to qualitative/quantitative analysis with an EDX-SEM (Energy Dispersive X-ray Spectrometer-Scanning Electron Microscope), the ratios of sulfur were 3 mass % in the comparative sample and 0 mass % in the inventive sample.

These were bent to 180° to evaluate presence or absence of cracking of the nickel platings. While cracking was confirmed in the comparative sample 1, no cracking was confirmed in the inventive sample 1 at all.

Example 8

An electrodeposited wire tool of diamond abrasive grains having a central diameter of a grain size distribution of 41.39 μm was prepared. Consequently, effects similar to those of Example 7 were attained.

Example 9

In Example 9, an electrodeposited wire tool was prepared by changing diamond abrasive grains to metallized diamond abrasive grains. Consequently, effects similar to those of Example 7 were attained.

Example 10

Diamond abrasive grains having a central diameter of a grain size distribution of 29.82 μm were prepared. The laser diffraction grain size distribution measuring apparatus (Mastersizer S Ver. 2.19) by Malvern Instruments Ltd. was used for measuring the grain sizes of the diamond abrasive grains.

Then, three types of nickel sulfamate plating solutions shown in Table 2 were prepared, and the diamond abrasive grains were introduced into the respective ones of these.

Nickel sulfamate plating solutions similar to those in Examples A, B and C were employed as to Examples D, E and F respectively.

The prepared abrasive grains were introduced into the aforementioned plating solutions, and dispersed. Electrodeposited wire tools were prepared by makings brassed piano wires of 0.18 mm in diameter ϕ which are substrates adsorb the abrasive grains and fixing the abrasive grains by nickel platings.

Each plating solution was fed a flow rate of 8 dm³/min into a container having a sectional area of 2000 mm² at a current density of 50 A/dm³.

All plating thicknesses were set to 15 μm.

10 samples were prepared by cutting each of the aforementioned three types of wires into 30 mm.

The respective ones were first bent to 180 degrees.

The nickel platings did not crack in all samples of Examples D and E.

The nickel platings remarkably cracked in all samples of Example F. When the respective samples were quantitatively analyzed with an EDX-SEM, the following results were obtained:

Example D sulfur: detectable only at an error level.
Example E sulfur: detectable only at an error level.
Example F sulfur: 1.5 mass %

Thereafter the wires bent in the aforementioned manner were temporarily restored and further bent to 180 degrees again to evaluate presence or absence of cracking of the nickel platings as to Examples D and E.

The results were as follows:
Zero in 10 cracked in Example D.
Five in 10 cracked in Example E.

Table 5 shows results obtained by observing the samples of Example D with an EBSD apparatus (OIM) by TSL and a scanning electron microscope (JSM-7001F) by JEOL Ltd.

TABLE 5

| Diameter (μm) | Number |
|---|---|
| 0.1 | 227 |
| 0.3 | 134 |
| 0.5 | 22 |
| 0.7 | 14 |
| 0.9 | 7 |
| 1.1 | 3 |
| 1.3 | 1 |
| 1.5 | 0 |
| 1.7 | 1 |
| 1.9 | 1 |
| 2.1 | 1 |
| 2.3 | 1 |

TABLE 5-continued

| Diameter (μm) | Number |
|---|---|
| 2.5 | 0 |
| 2.7 | 1 |
| 2.9 | 1 |
| 3.1 | 0 |
| 3.3 | 1 |
| 3.5 | 1 |
| 3.7 | 0 |
| 3.9 | 0 |
| 4.1 | 0 |
| 4.3 | 0 |
| 4.5 | 0 |
| 4.7 | 0 |
| 4.9 | 0 |
| Average Grain Size (μm) | 0.279102 |

The samples were treated by ion polishing so that sections of the nickel platings in the prepared electrodeposited wire tools which are inventive samples could be observed, and the EBSD measurement was performed at an acceleration voltage of 20 kV and a measurement step of 0.03 μm, while the SEM observation was made at an acceleration voltage of 20 kV or 10 kV. The average grain size was calculated by EBSD analysis on condition that the respective ones of twin crystals were regarded as grain boundaries without including edge grains.

Table 6 shows results obtained by observing the samples of Example E with the EBSD apparatus (OIM) by TSL and the scanning electron microscope (JSM-7001F) by JEOL Ltd. under a similar condition.

TABLE 6

| Diameter (μm) | Number |
|---|---|
| 0.25 | 405 |
| 0.75 | 30 |
| 1.25 | 1 |
| 1.75 | 2 |
| 2.25 | 0 |
| 2.75 | 0 |
| 3.25 | 0 |
| 3.75 | 0 |
| 4.25 | 0 |
| 4.75 | 0 |
| 5.25 | 0 |
| 5.75 | 1 |
| 6.25 | 0 |
| 6.75 | 0 |
| 7.25 | 0 |
| 7.75 | 0 |
| 8.25 | 0 |
| 8.75 | 0 |
| 9.25 | 0 |
| 9.75 | 0 |
| Average Grain Size (μm) | 0.230646 |

Figure 19:
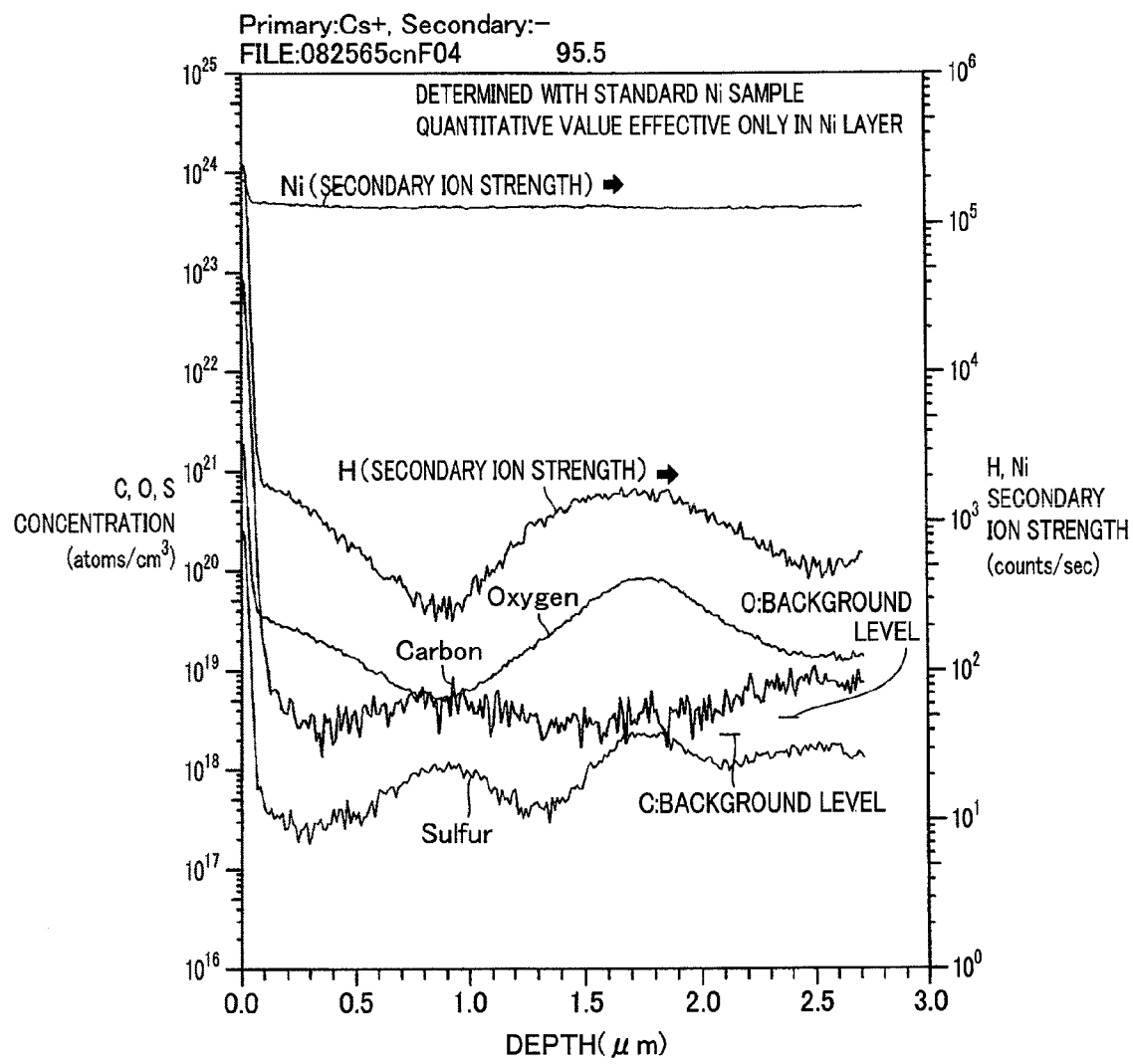
FIG. 19 is a graph showing SIMS analytical results of nickel platings formed on wires according to Example D.

FIG. 19 is a graph showing SIMS analytical results of nickel platings formed on the wires of Example D.

FIG. 19 shows examples measured with the SIMS apparatus (IMS-7F) by CAMECA. These results of measurement were obtained by digging the prepared electrodeposited wire tools which are the inventive samples up to depths of 2.5 μm from the nickel plating surfaces with cesium ions.

Average values in portions subsequent to those of 0.5 μm in depth from the surfaces are shown below. Portions up to those of 0.5 μm in depth from the surfaces were excluded in consideration of low accuracy of measured values.

Example D

Sulfur: $1.0 \times 10^{18}$ atoms/cm$^3$
Oxygen: $3.0 \times 10^{19}$ atoms/cm$^3$
Average strength ratio (hydrogen average/nickel average) of secondary ions: $5.8 \times 10^{-3}$
Average grain size of nickel grains: 0.28 μm Example E Sulfur: $5.8 \times 10^{18}$ atoms/cm$^3$
Oxygen: $4.0 \times 10^{20}$ atoms/cm$^3$
Average strength ratio (hydrogen average/nickel average) of secondary ions: $2.7 \times 10^{-2}$
Average grain size of nickel grains: 0.23 μm

DESCRIPTION OF THE REFERENCE SIGNS 1 superabrasive grain, 2 covering layer, 3 plating layer, 4 core wire, 10 electrodeposited wire tool, 41 outer peripheral surface.

The invention claimed is:

1. An elect electrodeposited wire tool comprising:
a magnetic linear body; and
a plurality of metallized abrasive grains provided with metal coatings fixed to the outer peripheral surface of said magnetic linear body with a plating layer, wherein
said metal coatings include electroless Ni—P platings having a P content of not less than 4 mass %, and said electroless Ni—P platings are at least partially crystallized,
wherein
said metallized abrasive grains contain diamond, and a strength ratio Ni$_3$P(231)/diamond(111) by XRD (X-ray diffraction) analysis is not less than 0.01 and not more than 0.3.

2. The electrodeposited wire tool according to claim 1, wherein
the P content in said electroless Ni—P platings is not less than 6 mass % and not more than 9 mass %.

3. The electrodeposited wire tool according to claim 1, wherein
crystals having grain sizes of not less than 10 nm are present by not less than $1 \times 10^7$/mm$^2$ and not more than $6 \times 10^9$/mm$^2$ on the average from the surfaces of said electroless Ni—P platings over portions where said metallized abrasive grains are present.

4. The electrodeposited wire tool according to claim 1, wherein
the ratio occupied by crystals having grain sizes of not less than 10 nm is not less than 20% and not more than 70% in said electroless Ni—P platings upon observation of sections from the surfaces of said electroless Ni—P platings over portions where said metallized abrasive grains are present.

5. The electrodeposited wire tool according to claim 1, wherein
said plating layer formed on the outer peripheral surface of said magnetic linear body is a nickel plating.

6. The electrodeposited wire tool according to claim 5, wherein
the average grain size of a nickel structure constituting said nickel plating is not less than 0.0155 times and not more than 1.000 time with respect to the thickness of said nickel plating.

7. The electrodeposited wire tool according to claim 5, wherein
the average content of S (sulfur) in said nickel plating is not more than 1 mass %.

8. The electrodeposited wire tool according to claim 5, wherein
the average content of S (sulfur) in said nickel plating is not less than 0 atoms/cm$^3$ and not more than $3.0 \times 10^{18}$ atoms/cm$^3$.

9. The electrodeposited wire tool according to claim 5, wherein
the average content of O (oxygen) in said nickel plating is not less than 0 atoms/cm$^3$ and not more than $2.0 \times 10^{20}$ atoms/cm$^3$.

10. The electrodeposited wire tool according to claim 1, wherein
the grain sizes of said metallized abrasive grains are not less than 5 μm and not more than 1000 μm.

11. The electrodeposited wire tool according to claim 5, wherein
the value of the thickness of said nickel plating/the average grain size of said metallized abrasive grains is not less than 0.26 and not more than 0.8 in said nickel plating and said metallized abrasive grains.

12. The electrodeposited wire tool according to claim 1, wherein
said magnetic linear body is a piano wire plated with brass or copper.

13. An electrodeposited wire tool comprising:
a magnetic linear body; and
a plurality of metallized abrasive grains provided with metal coatings fixed to the outer peripheral surface of said magnetic linear body with a plating layer, wherein
said metal coatings include electroless Ni—P platings having a P content of not less than 4 mass %, and said electroless Ni—P platings are at least partially crystallized, wherein
said plating layer formed on the outer peripheral surface of said magnetic body is a nickel plating, wherein
an average secondary ion strength ratio (average hydrogen strength/average Ni strength) between hydrogen and Ni is not less than 0 and less than $2.8 \times 10^{-2}$ when performing SIMS (Secondary Ion Mass Spectrometry) analysis in said nickel plating.

* * * * *